Oct. 6, 1931.  J. R. HAMILTON  1,826,072

FIRE PROTECTION APPARATUS

Filed April 27, 1929

Inventor
John R. Hamilton
Kim Hudson & Kent
Attys

Patented Oct. 6, 1931

1,826,072

UNITED STATES PATENT OFFICE

JOHN R. HAMILTON, OF CLEVELAND, OHIO, ASSIGNOR TO AUTOMATIC SPRINKLER COMPANY OF AMERICA, OF CLEVELAND, OHIO, A CORPORATION OF DELAWARE

FIRE PROTECTION APPARATUS

Application filed April 27, 1929. Serial No. 358,698.

This invention relates to fire protection apparatus and more particularly to a novel form of dry pipe sprinkler system for use in hangars for airplanes and the like.

Fires occurring in aircraft hangars, or in aircraft stored or housed in such hangars, cannot be readily extinguished with the type of sprinkler system in present day use, because in the operation of these systems fire extinguishing agent or fluid is allowed to fall from the sprinkler heads arranged near the ceiling of the building, and when the extinguishing agent is distributed in this manner, the wings and body portions of an airplane tend to deflect or shed the extinguishing agent away from various surfaces and portions of the airplane with the result that such fires are not quickly detected and cannot be readily extinguished.

It is, therefore, an object of this invention to provide a novel form of fire protection apparatus by which fires occurring in aircraft hangars, or in aircraft housed therein will be quickly detected and readily extinguished.

Another object of this invention is the provision of a novel and effective arrangement of sprinkler pipe systems.

A further object of this invention is the provision of means by which a fire may be quickly detected at its point of origin and an effective application of extinguishing agent at said point quickly begun.

The invention may be further briefly summarized as consisting in certain novel combinations and arrangements of parts hereinafter described and set out in the appended claims.

Figure 1:
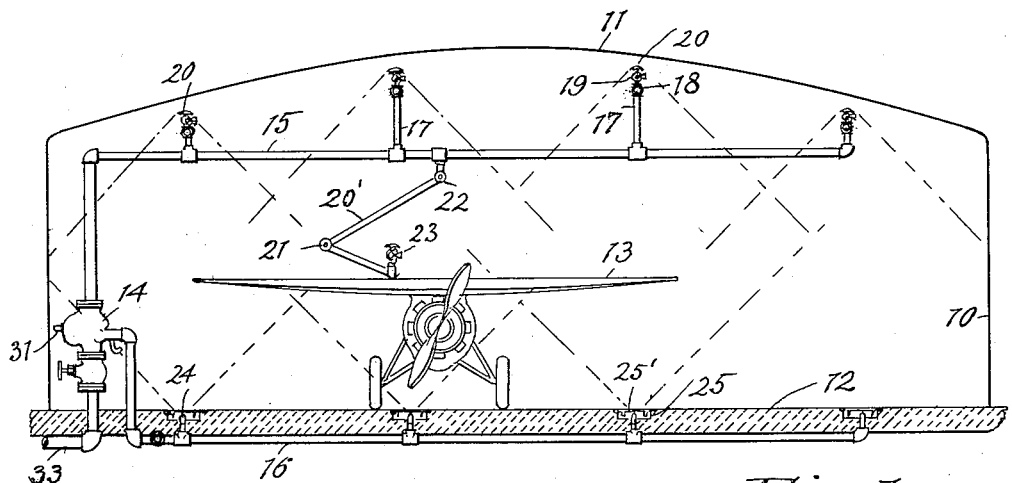

In the accompanying sheet of drawings forming a part of the disclosure of my invention, Fig. 1 is an elevational view showing an arrangement of fire protection apparatus embodying my invention.

Figure 2:
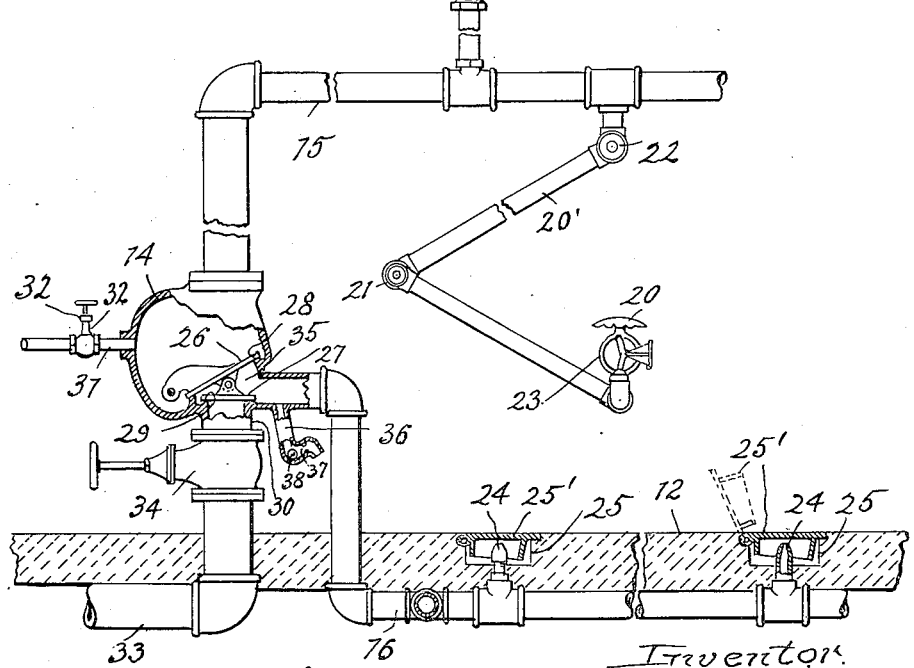

Fig. 2 is a fragmentary elevational view, with parts broken away, showing a portion of this apparatus.

Referring now to the drawings for a detailed description of my invention, I have shown for the purpose of illustration an aircraft hangar to which my fire protection apparatus has been applied. It should be understood, however, that the apparatus of my invention is not limited in its application to the protection of aircraft hangars and aircraft housed therein, but may, if desired, be used for protecting structures of other types such as factory buildings and warehouses.

In Fig. 1 of the drawings, I have represented diagrammatically an airplane hangar 10 provided with a roof or ceiling 11 and having a floor 12. The hangar may be of any desired shape or form to provide suitable space for housing or storing one or more airplanes as represented at 13.

The fire protection apparatus of my invention consists of a valve casing 14, to which are connected one or more overhead distributing pipe systems 15, and one or more floor distributing pipe systems 16. Riser pipes 17 extend upwardly from the distributing pipe 15 to points adjacent the roof 11, and are connected to longitudinally extending distributing pipes 18 upon which sprinkler heads 19 are arranged for discharging fire extinguishing agent both downwardly and upwardly. Any suitable type of sprinkler head may be employed, but in this instance I show sprinkler heads of the thermal element type having curved plates 20 for deflecting a portion of the fire extinguishing agent downwardly. The overhead distributing system as thus far described corresponds with well known arrangements commonly in use, but it has been found that these systems, as heretofore used, do not afford sufficient protection against fires occurring in aircraft hangars and in aircraft stored therein, because the fire extinguishing agent discharged by the sprinkler heads of these systems is allowed to fall from the ceiling, near which the sprinkler heads are positioned, and the wings and body portions of airplanes housed in the hangar deflect or shed this fire extinguishing agent so that it cannot readily come into contact with the various wing and body portions of the airplanes. Furthermore, in these arrangements, the sprinkler heads are positioned relatively far away from the airplanes, and fires occurring in the airplanes themselves must progress to a very damaging extent before the sprinkler heads will be released; in other words, an early application of the extinguishing agent at the point of origin of the fire cannot be attained. Frequently when the sprinkler heads are released in these systems, only a small portion of the fire extinguishing agent discharged is effective for extinguishing the fire because a large portion of the extinguishing agent is deflected or shed away from the fire by the various wing and body portions of the airplane.

To obviate these difficulties and to provide means for quickly detecting a fire at its point of origin, and to provide means for applying extinguishing agent to the fire at such point of origin, I provide a flexible pipe extension 20' consisting of a suitable number of lengths of pipe connected together by universal joints 21 and connected to the distributing pipe system by a universal joint 22. At the end of this flexible pipe extension, I provide a suitable sprinkler head 23, which may be positioned near an airplane or, if desired, in one of the compartments thereof where a fire would be likely to originate. By providing a movable sprinkler head which can be selectively positioned with respect to the airplane or object to be protected, a fire occurring in the airplane will be very quickly detected, and fire extinguishing agent will be effectively applied to the fire at its point of origin and before the fire has progressed materially. While I have illustrated only one flexible extension, it is obvious that any suitable number of flexible extensions may be provided.

In order to discharge fire extinguishing agent upwardly against the surfaces of an airplane which are sheltered from the fire extinguishing agent discharged downwardly by the overhead distributing system, I provide nozzles 24 on the floor distributing pipe system 16. These nozzles are provided in suitable number and are arranged to extend upwardly into pockets or recesses 25 formed in the floor 12, so as to discharge fire extinguishing agent in a substantially upward direction. In the present arrangement, the distributing piping 16 is shown laid beneath the floor 12 so as to be in a protected and out of the way position, but if desired, this piping could be positioned above the floor, or in the flooring material. As a convenient means for closing the recesses 25, I have provided hinged covers 25' which serve to protect the nozzles from damage and prevent the accumulation of foreign matter in the recesses, and at the same time present a smooth surface flush with the surface of floor 12. When the system becomes operative, the covers 25' are swung to an open position by the force of the extinguishing agent discharged by the nozzles 24.

For automatically controlling the supply of fire extinguishing agent to the distributing pipe systems 15 and 16, I provide an air valve 26 and a water valve 27 operatively arranged in the valve casing 14. Any suitable type of valve mechanism may be employed but, in this instance, I have shown for the purpose of illustration, the air valve 26 pivotally mounted in the casing and cooperating with an air valve seat 28. The water valve 27 is pivoted to the air valve 26 and cooperates with a water valve seat 29 so as to normally close the fire extinguishing agent supply passage 30. Air pressure is supplied to the casing 14 and the distributing piping 15 by means of a pipe connection 31 which communicates with the casing 14 and is provided with a valve 32. This air pressure acting upon the air valve 26 maintains the air valve and the water valve 27 normally closed so as to exclude the fire extinguishing agent from the distributing pipe systems. Upon the opening of a sprinkler head the elastic fluid pressure in the distributing piping 15 and in the valve casing 14 is suddenly reduced, thus permitting fire extinguishing agent to be supplied to the distributing pipes 15 and 16. As shown in the drawings, fire extinguishing agent may be supplied to the valve casing by means of a pipe line 33 which is preferably provided with a valve 34 for conveniently closing off the supply of extinguishing agent.

The floor distributing piping 16 is connected to the valve casing 14 so as to communicate with the space 35 between the valve seats, which is commonly called the neutral chamber. For preventing an accumulation of fluid pressure or fire extinguishing agent in the neutral chamber, I provide a connection which establishes communication between this chamber and the atmosphere. Any suitable means may be employed for this purpose, but in this instance I show a tubular member 36 connected to the piping 16 adjacent the neutral chamber of the valve casing. This member is provided with a check valve consisting of a seat 37 and a ball 38 which is moved into engagement with the seat 37 when an excessive flow of fluid takes place through the member 36.

It will now be readily apparent that in event of a fire, a sprinkler head 23, or one or more of the sprinkler heads 19 will open and release the elastic fluid pressure in the distributing pipe 15. The sudden release of this pressure permits the air and water valves to swing to an open position in the casing 14 thereby permitting fire extinguishing agent to flow into the distributing pipe systems 15 and 16 from which the extinguishing agent will be discharged in a substantially downwardly direction by the sprinkler heads of the overhead system and in a substantially upwardly direction by the nozzles of the floor system so as to effectively supply fire extinguishing agent to all parts of the airplanes housed within the hangar.

In the specification and claims of this application I have referred to a "floor distributing pipe system" and it should be understood that this expression is intended to mean floor distributing piping which is arranged above the floor or within the flooring material as well as distributing piping arranged below the flooring as illustrated. It should also be noted that although the fire extinguishing agent is discharged in a general downward direction from the overhead pipe system, and in a general upward direction from the floor pipe system, the extinguishing agent discharged from these systems is also distributed laterally to some extent. Therefore, in using the words "upwardly" and "downwardly" in the specification and claims I use them in their broader sense, to designate the general directions in which the fire extingushing agent is discharged, and to some extent laterally distributed, from the pipe systems, rather than in their more limited sense in which they designate a true vertical direction.

While I have shown and described in detail the apparatus of my invention, it should be understood that I do not limit myself to these precise details, but regard my invention as including such modifications and changes as do not involve a departure from the spirit of the invention and the scope of the appended claims.

Having thus described my invention, what I claim is:

1. In fire extinguishing apparatus for a building having a substantially smooth floor upon which objects are freely movable, the combination of an overhead distributing pipe system having means for discharging fire extinguishing agent downwardly, a floor distributing pipe system located below the surface of said floor and having means for discharging fire extinguishing agent upwardly, the last mentioned discharge means being disposed in pockets provided in the surface of said floor, means for automatically supplying fire extinguishing agent to said systems, and closure means for said recesses normally flush with the surface of said floor and adapted to be moved by the flow of extinguishing agent.

2. In fire extinguishing apparatus for a building having a substantially smooth floor upon which objects are freely movable, the combination of an overhead distributing pipe system having sprinkler heads for discharging fire extinguishing agent downwardly, a floor distributing pipe system below the surface of said floor and having nozzles for discharging fire extinguishing agent upwardly, said nozzles being disposed in said floor but below the top surface thereof so as not to interfere with the movement of said objects, movable cover means for said nozzles, said cover means being substantially flush with the surface of said floor, and means for automatically supplying fire extinguishing agent to said systems simultaneously.

3. In fire extinguishing apparatus for a building having a substantially smooth floor upon which objects are freely movable, the combination of an overhead dry-pipe distributing system adapted to contain elastic fluid under pressure, means on said overhead system for discharging fire extinguishing agent downwardly, a floor distributing system located below the surface of said floor, means on said floor system for discharging fire extinguishing agent upwardly, the last mentioned discharging means being disposed in said floor but below the top surface thereof so as not to interfere with the movement of said objects and means operable upon a reduction in the pressure of said elastic fluid for simultaneously supplying fire extinguishing agent to said systems.

4. In apparatus of the character described the combination of a distributing pipe extending near an article to be protected, a flexible pipe extension connected to said distributing pipe, a heat responsive sprinkler head carried by said flexible pipe and adapted to be selectively positioned with respect to said article, and means for automatically supplying fire extinguishing agent to said pipes.

5. In apparatus of the character described the combination of an overhead distributing pipe extending near an article to be protected and having means for discharging fire extinguishing agent downwardly, discharge means flexibly connected with said overhead pipe and adapted to be selectively positioned with respect to said article, a floor distributing pipe having means for discharging fire extinguishing agent upwardly, and means for automatically supplying fire extinguishing agent to said distributing pipes.

6. In apparatus of the character described the combination of a distributing pipe arranged below a floor surface, discharge means associated with said distributing pipe and adapted to extend into recesses formed in the surface of said floor, means for automatically supplying fire extinguishing agent to said distributing pipe, and means for closing said recesses, said closing means being adapted to be moved by the flow of extinguishing agent from said discharge means.

7. In fire extinguishing apparatus for a building having a substantially smooth floor upon which objects are freely movable, the combination of an overhead dry-pipe distributing system adapted to normally contain elastic fluid under pressure, means on said overhead system for discharging fire extinguishing agent substantially downwardly, a floor distributing system below the surface of said floor, normally open means on said floor system for discharging fire extinguishing agent substantially upwardly, said normally open means being disposed in the material of said floor but below the top surface thereof so as not to interfere with the movement of said objects, and means operable upon a reduction in the pressure of said elastic fluid for simultaneously supplying fire extinguishing agent to said systems.

8. In apparatus of the character described the combination of an overhead distributing pipe extending near an article to be protected and having means for discharging fire extinguishing agent substantially downwardly, discharge means flexibly connected with said overhead pipe and adapted to be selectively positioned with respect to said article, a floor distributing pipe having normally open means for discharging fire extinguishing agent substantially upwardly, and means for automatically supplying fire extinguishing agent to said distributing pipes.

In testimony whereof, I hereunto affix my signature.

JOHN R. HAMILTON.